(12) United States Patent
Singh et al.

(10) Patent No.: US 10,347,141 B2
(45) Date of Patent: Jul. 9, 2019

(54) SYSTEM AND METHOD FOR TRANSMITTING OBSTACLE ALERTS TO AIRCRAFT FROM A GROUND BASED DATABASE

(71) Applicant: HONEYWELL INTERNATIONAL INC., Morris Plains, NJ (US)

(72) Inventors: Jayant Kumar Singh, Bangalore (IN); Nithin Ambika, Bangalore (IN); Subhadeep Pal, Bangalore (IN); Saurabh Gohil, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 122 days.

(21) Appl. No.: 15/498,032

(22) Filed: Apr. 26, 2017

(65) Prior Publication Data

US 2018/0315324 A1 Nov. 1, 2018

(51) Int. Cl.
*G08G 5/04* (2006.01)
*G08G 5/00* (2006.01)
*G05D 1/00* (2006.01)
*G05D 1/02* (2006.01)
*B64C 39/02* (2006.01)
(Continued)

(52) U.S. Cl.
CPC ............ *G08G 5/04* (2013.01); *B64C 39/024* (2013.01); *G05D 1/0011* (2013.01); *G05D 1/0088* (2013.01); *G05D 1/0202* (2013.01); *G08G 5/0013* (2013.01); *G08G 5/0086* (2013.01); *G08G 9/02* (2013.01); *B64C 2201/141* (2013.01); *B64C 2201/146* (2013.01); *G08G 1/165* (2013.01)

(58) Field of Classification Search
None
See application file for complete search history.

(56) References Cited

U.S. PATENT DOCUMENTS 3,668,403 A * 6/1972 Meilander ........... G01S 13/9303
342/36
4,293,857 A * 10/1981 Baldwin ............. G01S 13/9303
342/32
(Continued)

FOREIGN PATENT DOCUMENTS

DE 102005031439 A1 1/2007

OTHER PUBLICATIONS

Definition "safety envelope" refer to DOE Handbook Glossary of Environment, Safety and Health, defintion 552, all pages, publication date Jan. 2006, retrieved from http://hse.niordc.ir/uploads/86_24_dictionary_2006.pdf (Year: 2006).*
(Continued)

Primary Examiner — Calvin Cheung
(74) Attorney, Agent, or Firm — Lorenz & Kopf, LLP

(57) ABSTRACT

A method for providing obstacle alerts to an in-flight aircraft has been developed. First, parameters of an in-flight aircraft are transmitted to a ground based processor station. The station calculates an aircraft safety envelope based on these parameters. The station accesses the characteristics of obstacles stored in a terrain database and calculates an obstacle safety envelope. Finally, the station determines if the aircraft safety envelope conflicts with the obstacle safety envelope and generates an alert for the aircraft if a conflict exists.

15 Claims, 3 Drawing Sheets

(51) Int. Cl.
*G08G 9/02* (2006.01)
*G08G 1/16* (2006.01)

(56) References Cited

U.S. PATENT DOCUMENTS

| | | | | |
|---|---|---|---|---|
| 5,459,469 | A * | 10/1995 | Schuchman | G01S 13/765 |
| | | | | 342/32 |
| 5,587,929 | A * | 12/1996 | League | G01S 13/726 |
| | | | | 342/118 |
| 5,936,574 | A * | 8/1999 | Klaschka | G01S 5/0072 |
| | | | | 342/357.31 |
| 5,983,161 | A * | 11/1999 | Lemelson | G01S 19/11 |
| | | | | 340/436 |
| 6,133,867 | A | 10/2000 | Eberwine | G01S 5/0072 |
| | | | | 342/125 |
| 6,181,990 | B1 * | 1/2001 | Grabowsky | B64D 47/00 |
| | | | | 701/14 |
| 6,393,362 | B1 * | 5/2002 | Burns | G05D 1/0278 |
| | | | | 340/940 |
| 6,456,941 | B1 * | 9/2002 | Gutierrez | G01C 21/00 |
| | | | | 701/301 |
| 6,512,976 | B1 * | 1/2003 | Sabatino | G01C 21/005 |
| | | | | 342/357.36 |
| 7,668,628 | B1 * | 2/2010 | Carrico | G01C 23/005 |
| | | | | 340/961 |
| 7,698,025 | B1 * | 4/2010 | Cornell | G01C 23/00 |
| | | | | 244/75.1 |
| 7,747,364 | B2 | 6/2010 | Roy et al. | |
| 8,049,644 | B1 * | 11/2011 | Oehlert | G06T 17/05 |
| | | | | 340/963 |
| 8,629,788 | B1 * | 1/2014 | Greenleaf | G08G 5/0091 |
| | | | | 244/116 |
| 8,798,812 | B2 * | 8/2014 | Ryu | G01S 13/94 |
| | | | | 701/120 |
| 9,310,222 | B1 * | 4/2016 | Suiter | G01C 23/005 |
| 9,405,005 | B1 * | 8/2016 | Arteaga | G01S 13/91 |
| 2001/0013836 | A1 * | 8/2001 | Cowie | G08G 5/0078 |
| | | | | 340/961 |
| 2001/0023390 | A1 * | 9/2001 | Gia | G01C 21/00 |
| | | | | 701/301 |
| 2005/0150997 | A1 * | 7/2005 | Sjanic | G01C 21/20 |
| | | | | 244/3.1 |
| 2006/0167598 | A1 * | 7/2006 | Pennarola | G08G 5/0013 |
| | | | | 701/11 |
| 2006/0235610 | A1 * | 10/2006 | Ariyur | G01C 21/005 |
| | | | | 701/533 |
| 2007/0174005 | A1 * | 7/2007 | Bitar | G01C 23/005 |
| | | | | 701/431 |
| 2007/0290918 | A1 * | 12/2007 | Filias | G05D 1/0646 |
| | | | | 342/29 |
| 2008/0183344 | A1 | 7/2008 | Doyen et al. | |
| 2008/0306639 | A1 * | 12/2008 | Fleury | G08G 5/0078 |
| | | | | 701/7 |
| 2009/0002222 | A1 * | 1/2009 | Colburn | G01C 9/00 |
| | | | | 342/145 |
| 2009/0027253 | A1 * | 1/2009 | van Tooren | G01S 13/9303 |
| | | | | 342/29 |
| 2010/0017114 | A1 * | 1/2010 | Tehan | G01C 21/00 |
| | | | | 701/423 |
| 2010/0023264 | A1 | 1/2010 | G. | |
| 2010/0109936 | A1 | 5/2010 | Levy | |
| 2010/0121575 | A1 | 5/2010 | Aldridge et al. | |
| 2010/0305724 | A1 * | 12/2010 | Fry | A63F 13/10 |
| | | | | 700/92 |
| 2013/0006450 | A1 * | 1/2013 | Del Amo Blanco | G08G 5/0034 |
| | | | | 701/14 |
| 2013/0066543 | A1 | 3/2013 | Agarwal et al. | |
| 2013/0099065 | A1 * | 4/2013 | Stuhlberger | B64C 29/0033 |
| | | | | 244/7 C |
| 2013/0197721 | A1 * | 8/2013 | Gu | G06Q 10/00 |
| | | | | 701/3 |
| 2014/0018976 | A1 * | 1/2014 | Goossen | G06F 17/00 |
| | | | | 701/2 |
| 2014/0343761 | A1 * | 11/2014 | Pastor | B64C 13/18 |
| | | | | 701/7 |
| 2016/0253908 | A1 * | 9/2016 | Chambers | B64C 39/024 |
| | | | | 701/2 |
| 2016/0275801 | A1 * | 9/2016 | Kopardekar | G08G 5/0043 |
| 2016/0292932 | A1 * | 10/2016 | Gremmert | G07C 5/008 |
| 2018/0075762 | A1 * | 3/2018 | Gadgil | G08G 5/0078 |
| 2018/0233008 | A1 * | 8/2018 | Hoos | G08B 13/19652 |

OTHER PUBLICATIONS

Extended European Search Report for Application No. 18168626.2 dated Sep. 21, 2018.

* cited by examiner

US 10,347,141 B2

SYSTEM AND METHOD FOR TRANSMITTING OBSTACLE ALERTS TO AIRCRAFT FROM A GROUND BASED DATABASE

The present invention generally relates to an aircraft alert system, and more particularly to a system for transmitting obstacle alerts to aircraft from a ground-based database.

BACKGROUND

Obstacle alert systems are common in a large commercial aircraft. These systems typically monitor multiple aircraft parameters and provide alerts to the crew upon sensing obstacles in proximity to the aircraft. One example of such a system is the Enhanced Ground Proximity and Warning System (EGPWS) which is an on-board system that compares the aircraft parameters with an onboard terrain database. However, the system requires routine upgrades and maintenance to the database. Also, the database requires a significant amount of storage in the onboard computer system of the aircraft. Sufficient storage space for such a large database may not exist on smaller aircraft. Accordingly, it is desirable to provide a system and method for transmitting obstacle alerts for an aircraft from a ground-based database.

BRIEF SUMMARY

Various embodiments of a system for collecting line replaceable unit removal data and a method for collecting line replaceable unit removal data are disclosed herein.

In one embodiment, a method for providing obstacle alerts to an in-flight aircraft, comprises: transmitting parameters of the in-flight aircraft to a ground-based processor station; calculating an aircraft safety envelope based on the transmitted parameters of the in-flight aircraft with the ground-based processor station; calculating an obstacle safety envelope based on characteristics of terrestrial obstacles stored in a terrain database that is accessible by the ground-based processor station; determining if the aircraft safety envelope conflicts with the obstacle safety envelope with the ground-based processor station; and generating an obstacle alert for the in-flight aircraft if a conflict between the aircraft safety envelope and obstacle safety envelope exists.

In another embodiment, a system for providing obstacle alerts to the vehicle, comprises: a transceiver on board the vehicle that transmits performance parameters of the vehicle; a remotely located antenna that receives the performance parameters from the transceiver; a remotely located terrain database that stores obstacle characteristics of terrestrial obstacles located in proximity to the vehicle; and a remotely located computer system that receives the performance parameters from the antenna and the obstacle characteristics in proximity to the vehicle from the terrain database, where the computer system calculates a vehicle safety envelope based on the performance parameters and an obstacle safety envelope based on the obstacle characteristics, where the computer system generates an obstacle alert for the vehicle if the vehicle safety envelope conflicts with the obstacle safety envelope.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
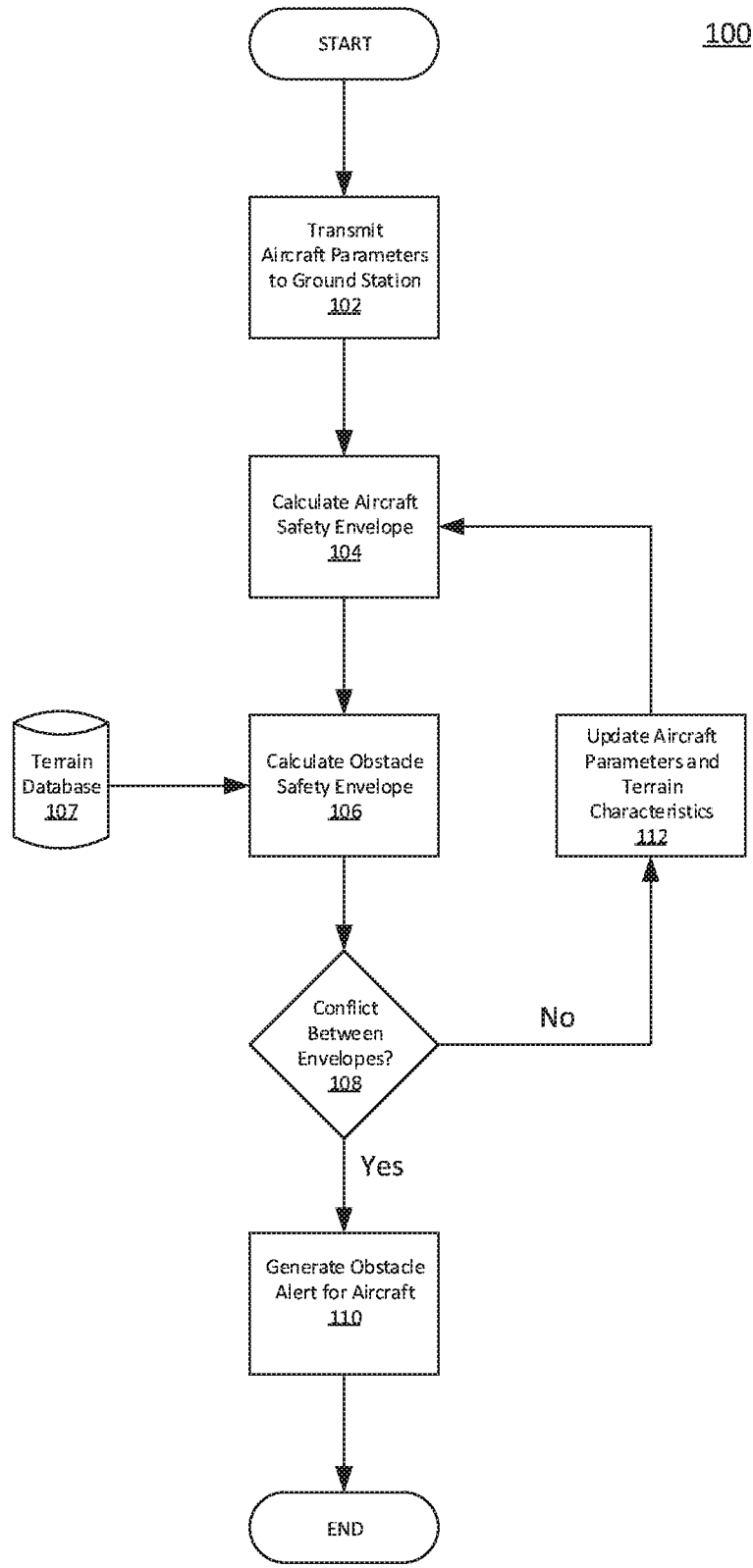
FIG. 1 is a flowchart showing a method for generating an obstacle alert to an in-flight aircraft in accordance with an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor module (shared, dedicated, or group) and memory module that executes one or more software or firmware programs, a combinational logic circuit, and/or other suitable components that provide the described functionality.

A method for providing obstacle alerts to an in-flight aircraft has been developed. FIG. 1 shows a flowchart of an exemplary embodiment of the method for providing the obstacle alerts. First, an in-flight aircraft transmits its flight parameters to a ground-based station 102. The ground-based station has a computer system with a processor that calculates an aircraft safety envelope based on the aircraft's parameters 104. The computer system will also calculate an obstacle safety envelope for any terrestrial obstacles in proximity to the aircraft 106. The obstacle safety envelope calculations are based on characteristics of terrestrial obstacles stored in a terrain database 107 that is accessed by the computer system. The computer system compares the two safety envelopes and looks for conflict between the them 108. If a conflict exists, the computer system generates an obstacle alert for the aircraft 110. If no conflict is found, the system continuously updates the aircraft parameters. The system also obtains more terrestrial obstacle characteristics for additional obstacles in proximity to the aircraft 112. The computer system uses these updates to continuously recalculate both the aircraft safety envelope and the obstacle safety envelope 104 and 106.

Figure 2:
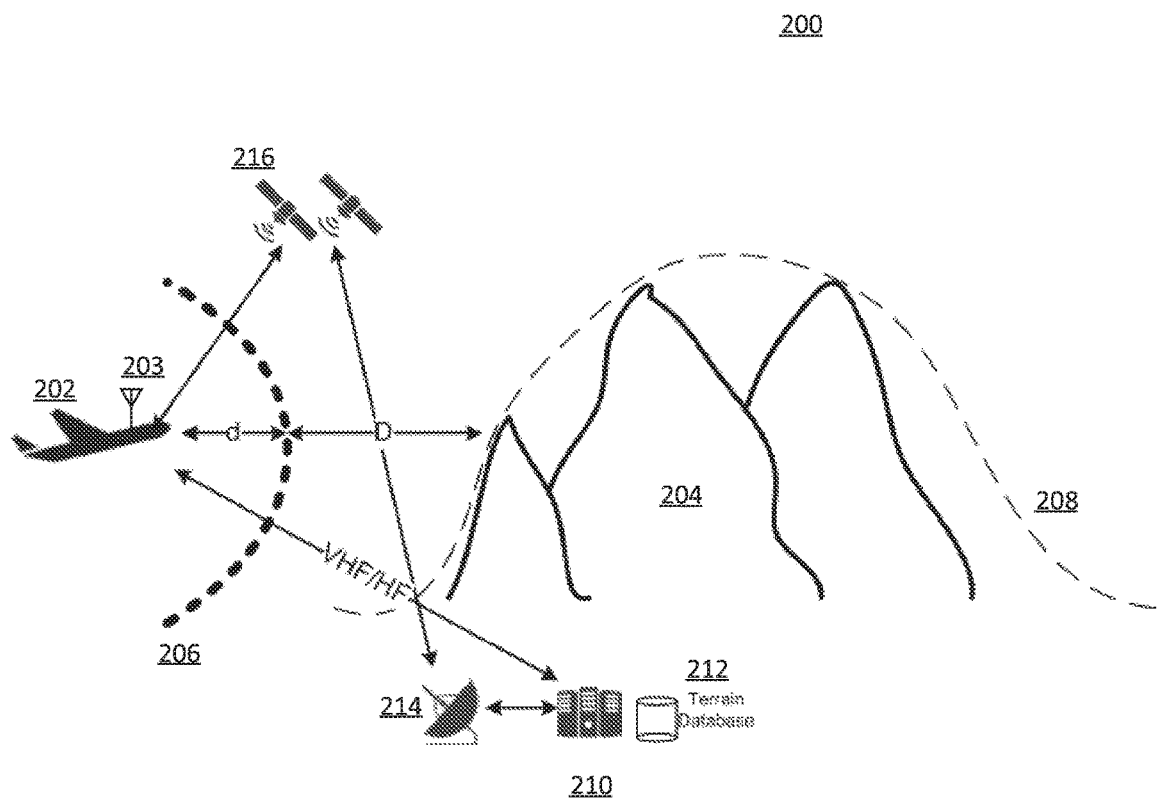
FIG. 2 is a diagram showing an aircraft safety envelope and obstacle safety envelope as calculated by ground-based database in accordance with an exemplary embodiment.

FIG. 2 shows a diagram 200 of an exemplary embodiment of an aircraft safety envelope and obstacle safety envelope as calculated by a ground-based computer system 210. As the aircraft 202 travels, a transceiver 203 on board the aircraft transmits the flight parameters to a ground antenna 214. Examples of the flight parameters of the aircraft include location, altitude, airspeed, flight angle, track, etc. The type of aircraft may vary between different embodiments. For some embodiments, the aircraft may be a conventional jet or prop driven aircraft. In other embodiments, the aircraft may be a rotor powered aircraft such as a helicopter or tilt rotor aircraft. In still other embodiments, the aircraft may be an unmanned aerial vehicle (UAV). The UAV may be either remotely piloted or autonomously piloted.

The transmission is direct link to the antenna through either very high frequency (VHF) or high-frequency (HF) radio signals in one embodiment. VHF typically has a frequency range between 30-300 MHz, while HF typically has a frequency range between 3-30 MHz. In another embodiment, the aircraft's 202 parameters are transmitted to the ground antenna 214 via satellite communications (SAT-COM) 216.

The ground antenna 214 is connected to a ground-based computer system 210 that receives the aircraft parameters. The computer system 210 retrieves characteristics of terrestrial obstacles 204 in proximity to the aircraft from a terrain database 212. The database may be an integrated part of a memory storage component of the computer system or it may be a separate and distinct module. In either embodiment, the database is fully accessible by the computer system. Examples of characteristics stored in the database include the elevation of mountains, the presence of electrical transmission lines, the height of bridges and buildings, etc. The computer system will access characteristics of all obstacles in proximity to the aircraft's location as determined by the aircraft's parameters.

The computer system will next calculate an aircraft safety envelope 206 based on the aircraft parameters and also calculate an obstacle safety envelope 208 based on the obstacle characteristics. The computer system calculates the aircraft safety envelope by using the aircraft parameters to extrapolate the aircraft trajectory and build an imaginary envelope around the aircraft. The size of the safety envelope is large enough for the crew of the aircraft to avoid any obstacles that should enter the safety envelope. Next, the computer system calculates the obstacle safety envelope based on the terrain characteristics (e.g., the elevation of a mountain). The obstacle safety envelope is large enough so that an aircraft entering the envelope has adequate time to take action to avoid the obstacle.

In an alternative embodiment, the obstacle safety envelope as calculated based on current atmospheric conditions in addition to obstacle characteristics. Atmospheric conditions may include cloud cover, wind, available daylight, lunar illumination, fog, storms, or any other meteorological or atmospheric conditions that affect visibility or performance of the aircraft. The atmospheric conditions may be considered to expand the obstacle safety envelope and expand the aircraft safety envelope as well. The current atmospheric conditions are obtained by the computer system via a real-time weather data stream in some embodiments.

Figure 3:
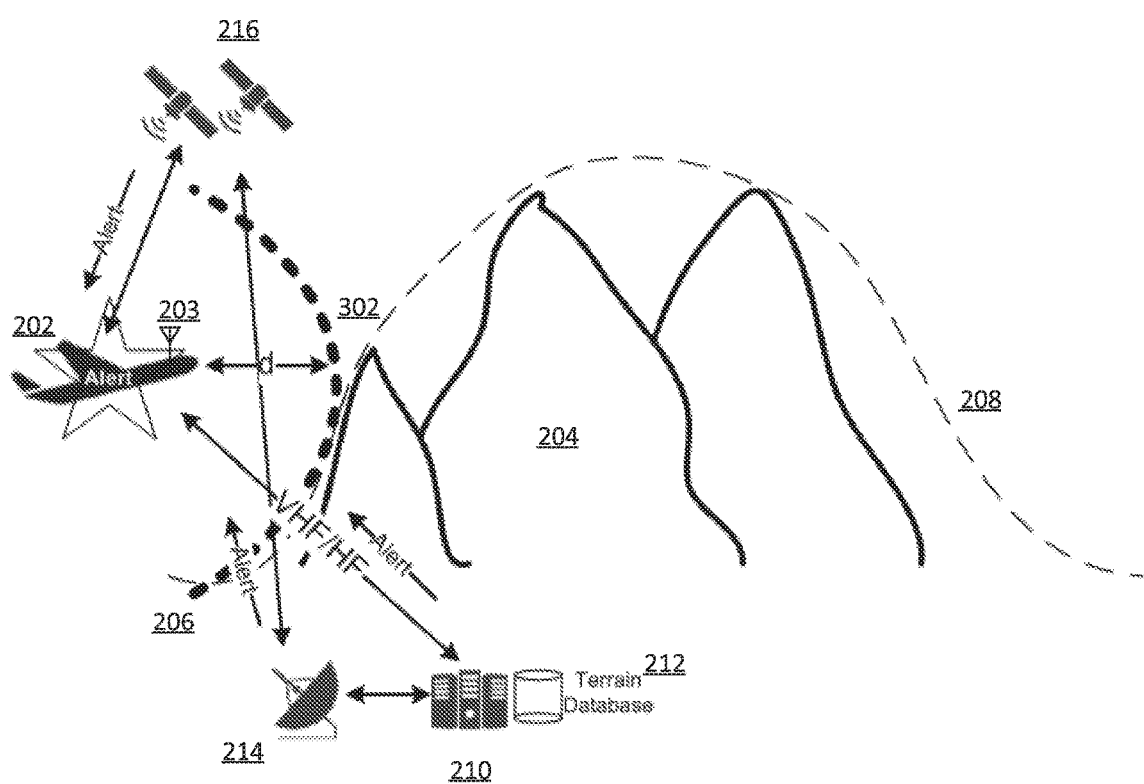
FIG. 3 is a diagram showing an aircraft safety envelope conflicting with an obstacle safety envelope in accordance with another exemplary embodiment.

FIG. 3 shows a diagram of an aircraft safety envelope 206 in conflict with an obstacle safety envelope 208 in accordance with one embodiment. When the computer system 210 detects a conflict between the two safety envelopes, an obstacle alert is transmitted to the aircraft 202. The alert notifies the crew in time to avoid the obstacle. Because the flight parameters of an aircraft may change rapidly, the aircraft safety envelope is updated periodically. In some embodiments, the aircraft parameters may be updated and the aircraft safety envelope may be recalculated once every 3-4 seconds. The obstacle safety envelope may be periodically recalculated as well if it is partially based on atmospheric conditions which are subject to change.

The various embodiments of the system and method have been described as applying to the in-flight aircraft. However, it should be understood that alternative embodiments could apply to other types of vehicles. For example, an alternative embodiment could provide obstacle alerts for a ship or other maritime craft. Still other embodiments could apply to ground vehicles including autonomous vehicles. The same principles described previously for generating alerts to the in-flight aircraft could apply in a similar manner for these types of vehicles.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

One skilled in the art will appreciate that the depiction of the system and the various components are merely exemplary and are not limiting with respect to size of the components or location within the system thus, the present disclosure is not limited to any specific layout and the system may include additional electronic components not shown in its implementation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as setforth in the appended claims.

What is claimed is:

1. A method for providing obstacle alerts to an in-flight aircraft, comprising:
    transmitting parameters of the in-flight aircraft to a ground-based processor station;
    calculating an aircraft safety envelope that surrounds the in-flight aircraft, where the aircraft safety envelope is based on the transmitted parameters of the in-flight aircraft with the ground-based processor station;
    calculating an obstacle safety envelope that surrounds terrestrial obstacles, where the obstacle safety envelope is based on characteristics of terrestrial obstacles stored in a terrain database that is accessible by the ground-based processor station;
    recalculating the aircraft safety envelope once every 3-4 seconds;
    determining if the aircraft safety envelope conflicts with the obstacle safety envelope with the ground-based processor station; and
    generating an obstacle alert for the in-flight aircraft if a conflict between the aircraft safety envelope and obstacle safety envelope exists.

2. The method of claim 1, where the in-flight aircraft comprises a rotor aircraft.

3. The method of claim 2, where the rotor aircraft comprises a helicopter.

4. The method of claim 2, where the rotor aircraft comprises a tilt rotor aircraft.

5. The method of claim 1, where the in-flight aircraft comprises an unmanned aerial vehicle (UAV).

6. The method of claim 5, where the unmanned aerial vehicle is autonomously piloted.

7. The method of claim 5, where the unmanned aerial vehicle is remotely piloted.

8. The method of claim 1, where the parameters of the in-flight aircraft and the obstacle alert are transmitted via satellite communications (SATCOM).

9. The method of claim 1, where the parameters of the in-flight aircraft and the obstacle alert are transmitted via very high frequency (VHF) radio.

10. The method of claim 1, where the parameters of the in-flight aircraft and the obstacle alert are transmitted via high-frequency (HF) radio.

11. The method of claim 1, where the aircraft safety envelope is periodically recalculated.

12. The method of claim 1, where the obstacle safety envelope is additionally calculated based on atmospheric conditions.

13. The method of claim 12, where the atmospheric conditions are accessible by the ground-based processor station via a real-time data stream.

14. A method for providing obstacle alerts to an in-flight aircraft, comprising:
    transmitting parameters of the in-flight aircraft to a ground-based processor station:
    calculating an aircraft safety envelope based on the transmitted parameters of the in-flight aircraft with the ground-based processor station;
    calculating an obstacle safety envelope based on characteristics of terrestrial obstacles stored in a terrain database that is accessible by the ground-based processor station:
    recalculating the aircraft safety envelope once every 3-4 seconds;
    determining if the aircraft safety envelope conflicts with the obstacle safety envelope with the ground-based processor station; and
    generating an obstacle alert for the in-flight aircraft if a conflict between the aircraft safety envelope and obstacle safety envelope exists.

15. A system for providing obstacle alerts to an in-flight aircraft, comprising:
    a transceiver on board the in-flight aircraft that transmits flight performance parameters of the in-flight aircraft;
    a remotely located antenna that receives the flight performance parameters from the transceiver;
    a remotely located terrain database that stores obstacle characteristics of terrestrial obstacles located in proximity to the in-flight aircraft; and
    a remotely located computer system that receives the flight performance parameters from the antenna and the obstacle characteristics in proximity to the in-flight aircraft from the terrain database, where the computer system calculates an aircraft safety envelope based on the flight performance parameters, where the aircraft safety envelope is recalculated once every 3-4 seconds, and an obstacle safety envelope based on the obstacle characteristics, where the computer system generates an obstacle alert for the in-flight aircraft if the aircraft safety envelope conflicts with the obstacle safety envelope.

* * * * *